United States Patent
Davin (10) Patent No.: US 7,600,121 B2
(45) Date of Patent: *Oct. 6, 2009

(54) MESSAGE SECURITY

(75) Inventor: Peter Davin, Västra Frölunda (SE)

(73) Assignee: Secured eMail Göteborg AB (SE)

( * ) Notice: Subject to any disclaimer, the term of this patent is extended or adjusted under 35 U.S.C. 154(b) by 545 days.

This patent is subject to a terminal disclaimer.

(21) Appl. No.: 10/938,608

(22) Filed: Sep. 13, 2004

(65) Prior Publication Data

US 2005/0114664 A1    May 26, 2005

(30) Foreign Application Priority Data

Sep. 12, 2003 (SE) .................... 0302456
Feb. 4, 2004 (SE) .................... 0400238

(51) Int. Cl.
G06F 15/16 (2006.01)
H04L 9/32 (2006.01)
G06F 1/12 (2006.01)
G06F 13/42 (2006.01)
H04L 5/00 (2006.01)
H04L 7/00 (2006.01)
H04L 9/00 (2006.01)

(52) U.S. Cl. .................... 713/170; 709/248; 713/400; 380/46; 380/47; 380/260; 380/262

(58) Field of Classification Search .................... 709/248; 713/170, 400; 380/46, 47, 260, 262
See application file for complete search history.

(56) References Cited

U.S. PATENT DOCUMENTS 5,412,730 A * 5/1995 Jones .................... 380/46

(Continued)

FOREIGN PATENT DOCUMENTS

WO    WO 01/91366 A2    11/2001

(Continued)

OTHER PUBLICATIONS

Enhanced IP Services for Cisco Networks by Donald C. Lee http://proquest.safaribooksonline.com/1578701066/ch07lev1sec3 Pub Date: Sep. 23, 1999.*

(Continued)

*Primary Examiner*—Kambiz Zand
*Assistant Examiner*—Benjamin A Kaplan
(74) *Attorney, Agent, or Firm*—Lerner, David, Littenberg, Krumholz & Mentlik, LLP (57) ABSTRACT

To provide a secure, effective but simple message handling, a method is provided for transmitting an electrical message, from a first user having a first terminal to a second user having a second terminal. The method comprises the steps of: transmitting said email in an encrypted form by said first terminal, said encrypted e-mail being encrypted by means of a key generated by a first key generator using a seed, providing once said second user with said seed for generating a key with a second key generator provided in said second terminal, providing to and storing said seed in said second terminal, using said seed by said second terminal for generating a key each time an encrypted email from said first user to said second user is received, synchronizing a counting value in each terminal; and generating said key on the basis of said seed and a counting value in each terminal, independently of other terminal.

22 Claims, 3 Drawing Sheets

U.S. PATENT DOCUMENTS

| | | | |
|---|---|---|---|
| 6,480,957 B1 | 11/2002 | Liao et al. | |
| 7,120,696 B1 * | 10/2006 | Au et al. | 709/229 |
| 7,209,560 B1 * | 4/2007 | Fairman et al. | 380/255 |
| 2001/0033662 A1 * | 10/2001 | Nishikawa | 380/262 |
| 2007/0172066 A1 * | 7/2007 | Davin | 380/262 |

FOREIGN PATENT DOCUMENTS

| | | |
|---|---|---|
| WO | WO 02/39660 A2 | 5/2002 |

OTHER PUBLICATIONS

Access Control Lists: Overview and Guidelines http://web.archive.org/web/20070701173653/http://www.cisco.com/univercd/cc/td/doc/product/software/ios113ed/113ed_cr/secur_c/scprt3/scacls.htm Copyright 1989-1997 © Cisco Systems Inc.*

Microsoft® Computer Dictionary, Fifth Edition by Microsoft Corporation Pub Date: May 1, 2002 http://proquest.safaribooksonline.com/0735614954/ch09 Excerpt hash-hash value.*

Pretty Good Privacy ™ PGP for Personal Privacy, Version 5.0 ftp://ftp.pgpi.org/pub/pgp/5.0/manual/win95nt/english/pgp50manual.pdf © 1997 by Pretty Good Privary, Inc. All rights reserved.*

RSA Laboratories™ FAQ about Today's Cryptography 4.1—May 2000 pp. 157, 163 http://www.rsa.com/products/bsafe/documentation/cypto-c_me21html/RSA_Labs_FAQ_4.1.pdf Copyright © 1992-2000 RSA Security Inc. All rights reserved.*

One-Time Pad Generator Program, URL, John Walker, http://www.fourmilab.ch/onetime/otpgen.html.

One-Time Pad Generator Program, URL, John Walker, May 26, 1997, http://www.fourmilab.ch/onetime/otpjs.html.

* cited by examiner

MESSAGE SECURITY

THE FIELD OF THE INVENTION

The present invention relates to a method and system for secure and encrypted transmission of messages, in particular e-mails, in a communication network.

THE BACKGROUND OF THE INVENTION

It is now a normal behaviour to communicate via electrical mail (email) as the access to Internet and other intra networks has increased. Everyday millions of emails are sent over Internet, containing many types of information. Emailing is also used within the companies and enterprises for internal and external communications. Many of the emails contain sensitive and secret information.

Unfortunately, not all emails reach their destination and might even be received by wrong addressees. Moreover, it is usually easy for unauthorised persons to crack servers, or access networks and read emails.

There is provided a number of solutions for sending encrypted e-mails: PGP (Pretty Good Privacy) (PGP and Pretty Good Privacy are registered trademarks of PGP Corporation) is one application that is used for sending encrypted emails. This application is a plug in for email programs based on using public-keys. Two users exchange public keys, which then can be used to encrypt and decrypt e-mails or other files. Moreover, when an email is encrypted and transmitted with the receiver's public key, the sending party cannot access the email.

It is also possible to provide a document and attach it to the e-mail and give the addressee the password for accessing the attachment.

Both these solutions imply that each time a new encrypted file or e-mail is accessed a password or a personal key must be used. A passwords and personal key can be forgotten or come into possession of unauthorised persons. Moreover, tests have shown that many people, to avoid forgetting a password/personal key, use family names, pet names etc., which can easily be guessed or even make notes.

In the international patent application WO 02/077773, a system, method, and computer program product for providing an encrypted email reader and responder is described. The method of distributing and initializing an encrypted e-mail includes: obtaining by a first user a license for an email client software application program having public/private encryption; requesting by the first user that a second user download a reader/responder software application program in order to exchange encrypted email between the first user and the second user; downloading and installing the reader/responder software application program by the second user; sending an email by the second user to the first user including embedding an unencrypted public key by using a send key function of the reader/responder software application program; receiving the email from the second user by the first user, wherein the unencrypted public key is embedded in the email; responding by the first user by sending a second email to the first user, where the reader/responder software application program encrypts a message of the second email into an encrypted message using the unencrypted public key of the second user; receiving the second email by the second user with the encrypted message as an attachment from the first user into a third party email software application program, wherein the third party email software application program is different from the reader/responder software application program and the email client software application program; and opening by the second user the attachment to execute the reader/responder software application program operative to allow a user without the email client software to read and respond to encrypted email created and sent from a user having the email client software.

Published U.S. application No. 2002059529, relates to secure email system for pre-selected email users forming a participating user group requiring secure communication, comprising a secure list server to which all secure emails are sent by members of the participating user group, the server comprising a store for certification data and a CPU which compares the names of intended recipients of each email message with data in the store and processes the message to facilitate onward certificated transmission provided the recipient is duly certificated as indicated by data in the store.

US 2003140235 relates to a method for exchanging electronic messages between a sender with an enrolled biometric feature set and a receiver with an enrolled biometric feature set, comprising: a. exchanging enrolled biometric feature sets between the sender and receiver; b. generating a live-scan biometric feature set of the sender; c. generating a first difference key derived from the difference between the sender's live-scan biometric feature set and the sender's enrolled biometric feature set; d. encrypting the message with the first difference key; e. encrypting said sender's live-scan biometric feature set with an encryption key; f. transmitting to the receiver the encrypted message and said encrypted sender's live-scan biometric feature set; g. decrypting by the receiver said encrypted sender's live-scan biometric feature set; h. regenerating by the receiver the first difference key by calculating the difference between said sender's live-scan biometric feature set and the sender's enrolled biometric feature set; and i. decrypting the message by use of the regenerated first difference key.

WO 01/91366 relates to an apparatus and method for generating pseudo-random cryptographic keys in cryptographic communications systems. Given a common set of initializing configuration data, the pseudo-random cryptographic keys can be duplicatively generated by various independent pseudo-random key generators of the cryptographic communications system.

WO 02/39660 relates to a system and method for cryptographic communication among multiple users and a central service provider using in situ generated cryptographic keys. Each user communicates with the central service provider preferably using a user communication interface that includes a local key generator, which, after initialization with the user's own individual seed value, generates a unique cryptographic key. By distributing different user individual seeds unique to each user, each user's a local key generator generates a unique set of keys. The central service provider also possesses a local key generator, and also preferably possesses a copy of all the individual seeds assigned to authorized users. The central service provider preferably communicates in a secure encrypted fashion with each user using cryptographic keys generated from that user's individual seeds. Distribution of additional seed values common to more than one user, via encrypted communication using the unique individual crpytographic key generations, then permit secure conditional access to said users via signal encryption using key generations resulting from a seed value common to the intended group of users.

In OTP: One-time pad generator program is a shareware program distributed through Internet (http://www.fourmilab.ch/onetime) for generating one-time pads or password lists.

THE SUMMARY OF THE INVENTION

The main object according to the best embodiment of the present invention is to provide a secure e-mailing system allowing encryption and decryption of e-mails without a need for repeated use of passwords or personal keys. In particular, the invention concerns generating synchronised encryption keys at, at least two remote sites for encrypting and decrypting emails or similar messages.

Another object of the present invention is to provide an e-mailing system that can filter undesired e-mails, so-called spam.

Yet another object of the present invention is to provide an e-mailing system that facilitates purchase of secure e-mail software programmes.

For these reasons, the invention according to the best embodiment relates to a method of transmitting an electrical message, preferably an email from a first user having a first terminal to a second user having a second terminal, comprising the steps of: transmitting said email in an encrypted form by said first terminal, said encrypted email being encrypted by means of a key generated by a first key generator using a seed, providing once said second user with said seed for generating a key with a second key generator provided in said second terminal, providing to and storing said seed in said second terminal, using said seed by said second terminal for generating a key each time an encrypted email from said first user to said second user is received, synchronising a counting value in each terminal; and generating said key on the basis of said seed and a counting value in each terminal, independently of other terminal.

Most preferably the seed is obtained only first time initiating time. Preferably a second seed is obtained if said first seed is unusable, e.g. when the application is reinstalled or installed on a new computer.

According to one embodiment, when a number of emails are sent to a receiver a dynamic serial number is obtained for each encrypted email. The dynamic serial number is used for generating a key for corresponding encrypted email.

According to one embodiment, the invention comprises further steps of synchronising a counting value in each terminal; and generating said key on the basis of said seed and a counting value in each terminal, independently of other terminal. The seed is saved in a dynamic and exchangeable fashion at least in one of the terminal, and preferably in all terminals. The counting value is generated in a counter in each terminal, the synchronisation of the counting values involving synchronisation of the counters. Following the initial synchronisation of the counters, the terminals execute supplementary synchronisation steps only when needed. The key-generating operation on the basis of the seed and the counting value is effected by means of a calculating algorithm stored in a non-dynamic and non-changeable fashion in at least one of the terminals.

According to one embodiment the invention also comprises the step of generating a list of entrusted terminals based on the received seed, and accepting emails only from registries in said list. Thus, spam can be stopped.

For security reasons, the invention, according to the best embodiment, comprises the step of providing said seed by said first user to said second user through at least one of phone call, fax or letter.

The encrypted email is provided with attachments encrypted together with the email.

The invention also relates to a system for transmitting emails from a first user to a second user. The system comprises a first terminal and a second terminal, the system further comprises: means for transmitting said secure email in form of an encrypted mail by said first terminal, said encrypted e-mail being encrypted by means of a key generated by a first key generator using a seed, means for providing once said second user with said seed for generating a key with a second key generator, means for providing to and means for storing said seed in said second terminal, means for generating a key each time an encrypted email from said first user to said second user is received by said second terminal using said seed.

Each terminal comprises a key-generating unit, which comprises a memory, in which identical seeds are stored, a counter to periodically change a counting value, and a calculating terminal adapted to generate in each terminal and independently of other terminals, and a key on the basis of the original value and a counting value issued from the counter. The memory for storing of the seed in at least one of the terminals is a dynamic memory arranged to store the seed in a dynamic and exchangeable fashion. The terminals are arranged to sense when they are not synchronised and to then reset synchronisation. The calculating unit of at least one of the terminals comprises a calculating algorithm, which is stored in a non-dynamic and non-changeable fashion, and which preferably is hardware-implemented. One of the terminals is a central terminal comprising a plurality of seeds for secure encrypted transmission involving several different terminals having one original value each.

The invention also relates to a computer program product for transmitting a secure e-mail from a first user having a first terminal to a second user having a second terminal, comprising a code for: encrypting and transmitting said email from said first terminal, generating a key using said first seed in said first terminal, obtaining said seed for generating a key with a second key generator in said second terminal, storing said seed in said second terminal, generating a key each time an encrypted email from said first user to said second user is received by said second terminal using said stored seed.

The invention also relates to a propagated signal for transmitting a secure email from a first user having a first terminal to a second user having a second terminal, comprising signal comprising a code for: encrypting and transmitting said email from said first terminal, generating a key using said first seed in said first terminal, obtaining said seed for generating a key with a second key generator in said second terminal, storing said seed in said second terminal, generating a key each time an encrypted email from said first user to said second user is received by said second terminal using said stored seed.

The invention also relates to a computer readable medium having stored therein instruction sets for transmitting a secure e-mail from a first user having a first terminal to a second user having a second terminal, said instruction set comprising a code for: encrypting and transmitting said email from said first terminal, generating a key using said first seed in said first terminal, obtaining said seed for generating a key with a second key generator in said second terminal, storing said seed in said second terminal, and generating a key each time an encrypted email from said first user to said second user is received by said second terminal using said stored seed. The medium may be a memory unit.

The invention also relates to a method of marketing an instruction set for transmitting and receiving a secure e-mail from a first user having a first terminal to a second user having a second terminal. The method comprising: transmitting said secure email in an encrypted form by said first terminal, said encrypted e-mail being encrypted by means of a key generated by a first key generator using a seed, providing said secure email with an accessible message referring to a vendor place, obtaining from said vendor place a second instruction set for decrypting said email, and debiting said second user for using said second instruction set for encrypting a new email. Most preferably the method is computerised. The billing is upon ordering or reception said second instruction set. The second instruction set is an access code to a preinstalled instruction set.

The invention also relates to a method of filtering emails to recipient, from a first user having a first terminal to the recipient being a second user having a second terminal, said email being transmitted in an encrypted form by said first terminal, said encrypted e-mail being encrypted by means of a key generated by a first key generator using a seed, providing once said second user with said seed for generating a key with a second key generator provided in said second terminal, generating a list of trusted senders by said second terminal based on a sender-receiver relation generated by said seed, and acting upon reception of an email, based on said list. The action can be one of storing, deleting or returning said email.

SHORT DESCRIPTION OF THE DRAWINGS

In the following the invention will be described with reference to enclosed schematic drawings, illustrating the preferred embodiments of the invention in a non-limiting invention.

DETAILED DESCRIPTION OF THE PREFERRED EMBODIMENTS

Basically, the invention allows providing an initiation seed to the system from both sending and receiving parties and generates, for each email, different but at each sender/receiver terminal same encryption keys based on same seed and without need of providing the seed each time an email is transmitted. The present invention according to a preferred embodiment is an application, realised as an add-on to an e-mail program such as Microsoft Outlook, Lotus Notes, Outlook Express etc. In the following, non-limiting examples are given with respect to Microsoft Outlook. However, it is appreciated that the teachings of the invention can be applied to any data communication application/system in general and emailing application/system in particular. The invention can thus be applied to SMS and MMS transmissions too.

Figure 1:
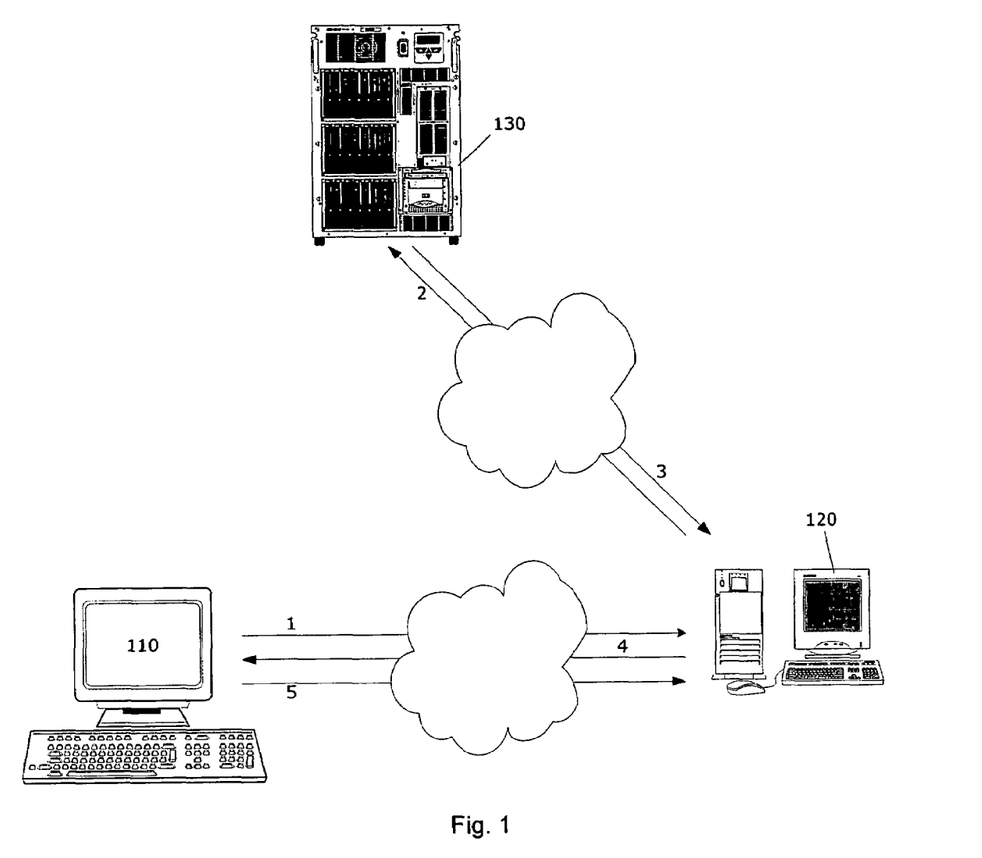
FIG. 1 is flow diagram over communication steps in a network according to the invention.

FIG. 1 illustrates the schematic communication flow between two users using computer terminals for sending and receiving e-mails. The transmitting terminal is designated with 110 and receiver with 120. Clearly, two terminals are given as an example and the invention can be applied on several terminals. The communication between the terminals is conducted through Internet or an intranet using an e-mail server running, e.g. Exchange Server.

The system of the invention creates a secure way for e-mail communication. Each sender/receiver relation between two e-mail addresses is concerned unique (channel). The system handles each pare of sender/receiver with their own specific encryption keys.

According to the flow diagram of FIG. 1, the user of terminal 110 sends (1) an email to the user of the receiving terminal 120. Terminal 110 is equipped with an application according to the present invention, which encrypts the emails. In the following example, the sender is assumed to have email address "110@mail.com" and the receiver "120@mail.com". The email message is encrypted using a conventional encryption algorithm such as SHS-1, Blowfish or the like and locked with an encryption key. If the encryption application detects that the receiver is not one of the entrusted receivers, i.e. the receiver is not in a register of receivers provided with a decryption application or decryption password, the application asks the sender to provide an initiating password or secret for the particular receiver.

The secret provided by the sender, e.g. 120xxx, is stored in the system together with other relevant information (such as email address) about the receiver. The secret is used:

for generating a key and initiating a channel having a key, e.g. 110120xxx, which is used for transmitting emails to receiver 120;

for generates a key, e.g. 120110xxx, which is used when receiving emails from 120; and generating a unique encryption key for transmitting emails. The key generation is described in more detail below.

It should be pointed out that channel herein refers to a virtual channel, and concerns the sender-receiver relation that is obtained.

If the receiver does not have a decryption application, the email is provided with a non-encrypted message to the receiver that the email is encrypted and to access (2) a program provider 130, e.g. an Internet service provider, to obtain/download (3) a decryption program. The encrypted email may also be sent as an attachment to a message (information) email. If the key is missing, i.e. the receiver has not received decryption permission, after installation of the decryption program, the receiver is instructed to obtain a "secret" to be able to generate a key for decrypting the e-mail. The receiver can for example call (4) the sender to obtain (5) the secret to initiate the key generation. When the encryption part is installed and the secret is inserted the encrypted email can be decrypted. The application at the receiver stores information about the sender and:

generates a key and initiated a channel having a key, e.g. 120110xxx, which is used for transmitting emails to the sender 110;

initiates a channel using a key, e.g. 110120xxx, which is used when receiving emails from 120; and generating a unique encryption key for receiving emails from the sender 110.

Thus, a sender-receiver relation is created.

In the subsequent steps, i.e. when the relation is created and both the sender and receiver have the initiated keys there is no need for new exchange of secrets or passwords. The sender and receiver applications at each terminal will automatically identify and generate an encryption/decryption key, e.g. based on the sender/receiver email address.

Next time when an email is sent from 110 to 120, the sender application detects that the receiver 120 is in the register and generates a new unique encryption key for the email, based on the generated channel. The key is used to encrypt the message. Together with the email a dynamic serial number is sent, which identifies the email order and the key used.

At the receiver site, the decryption application detects the dynamic serial of the encryption key used for encrypting the message. The decryption application generates a key based on the dynamic serial number (and the earlier stored secret) and decrypts the email. If the dynamic serial number is not in sequence, e.g. an email with lower serial number is received later than one with higher serial number, the application generates and stores all keys until the serial number, which is used for decrypting the specific encrypted email. All stored keys can then be used for decrypting the non-sequential emails. The keys are stored encrypted in the memory/storage unit and can be destroyed after decrypting corresponding encrypted email. Thus, the invention may also allow decrypting emails much later and also in off-line mode.

The sending party or email application may supply the message with setting parameters that will force the receiving party or email application to take special action. For instance, the sending party may demand that the received message is stored in a particular way, for instance as encrypted, or else not stored at all. This ensures that the sending party is confident that messages are stored at the receiver location in such a way that no unauthorized access is given to the messages. Other possible instructions is possible and the above mentioned example is only for illustrative purposes and not limiting to the invention, for instance, the sending party may demand an immediate removal of the email message after examination and not allow it to be stored in any way for maximum security.

Figure 2:
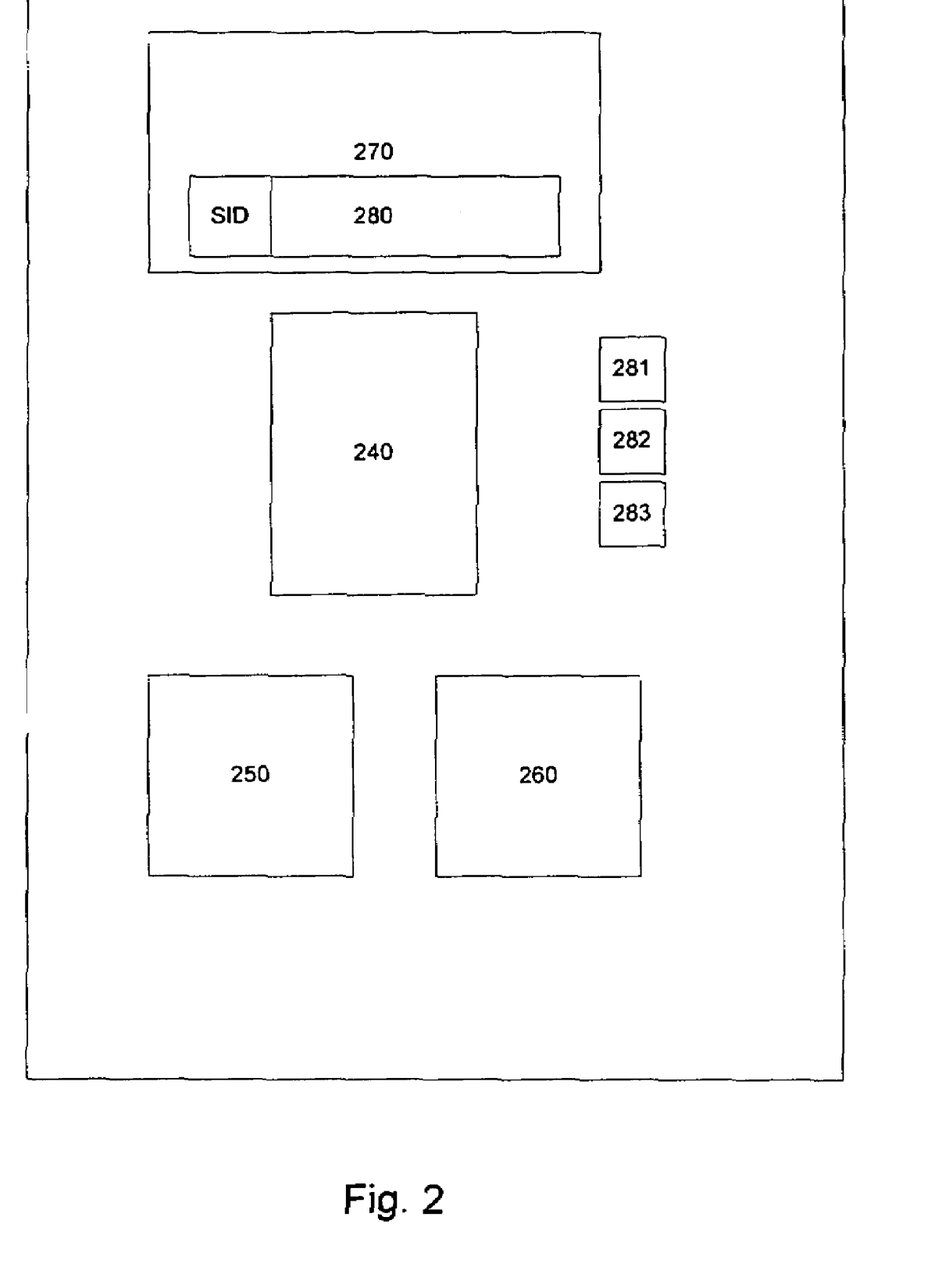
FIG. 2 is a block diagram illustrating a computer terminal.

Each terminal 210, e.g. an ordinary PC, schematically illustrated in FIG. 2, comprises a main processing unit 240, ROM (Read only Memory) 250, RAM (Random Access Memory) 260, and a program storage unit 270. The ROM contains instruction set, e.g. for terminal functionality. The RAM stores instruction from application programmes. The program storage unit includes application programmes such as an email application, encrypting and decrypting applications etc.

A key-generating application 280 comprises, in the storage unit or RAM, an identical original values SID, so called seeds, preferably in a dynamic and/inter/exchangeable manner. The storage of original values is preferably effected in connection with the introductory initiation of the application, and advantageously it could be effected via a secure channel, e.g. an encrypted message or a phone call or the like. Possibly, the original values need not, however, be transmitted physically but instead the users of the units concerned may themselves input a pre-agreed value. In addition, the original values may be exchanged, when needed, but alternatively the same original values are used for the duration of the entire life of the key-generating unit. In this case the original values need not be stored in dynamic memories, but instead permanent memories may be used.

In addition, the key-generating application controls a counter 281 to periodically change a counting value X, and a calculating unit/application 282 adapted to generate, in each and every unit and independently of other units, a key based on the original value, and a counting value issued by the counter.

Advantageously however, the counter and the calculating unit may be integrated in the same unit, which advantageously may be the processing unit (CPU). An oscillator 283 or a clock, which could likewise be integrated in the processor, may advantageously control the counter. Preferably the real-time-based clock, of the CPU is used. In addition, the counter is increased stepwise, whereby it becomes easier to keep the terminals in phase with one another (synchronised).

Provided that the same original values are stored in the memory and that the counters are synchronised to deliver the same counting value, identical keys may be generated in several key-generating applications, independently of one other, i.e. in each terminal running the application.

These keys may then be used for encrypting or authenticating purposes between the terminals.

Furthermore, the key-generating units preferably are adapted to sense whether they are synchronised or not, and in case they are not, to implement this synchronisation. Sensing may be performed by means of a particular synchronising test that is performed prior to the generation of keys.

Alternatively, a need for synchronisation may, however, be identified when different keys are used, and only thereafter may synchronisation resetting be effected. Synchronisation may be effected for example by exchange of counting values between the units.

According to one example, the calculating unit comprises a calculating algorithm F, which hashes the original value (seed), present key and the counting value as input parameters. Thereafter the count value increases by a number i.e. count=count+1. This calculating algorithm preferably is implemented in hardware in the calculating unit, or alternatively it is stored in a non-dynamic and unchangeable memory. The calculating algorithm preferably generates a 160-bit key, but keys of other lengths are of course also conceivable. Every time an order is given to the key generator to produce a new key therefore a new pseudorandom 160-bit word is generated, which is calculated on the basis of the "seed" and the counting value.

The key-generating application may further comprise an interface part serving to enable communication between the communicating unit and the key-generating unit. Preferably, this communication comprises emission of instructions to the key-generating unit to generate a key and the emission of a thus generated key back to the communicating unit.

The key-generating unit can be implemented in hardware and executed in the form of an integrated circuit, thereby making it more difficult to tamper with. The circuit may then be added to and used together with essentially any type of communicative unit. For example, it is possible to use the key-generating unit in accordance with the invention together with e-mailing applications.

The key-generating applications in accordance with the invention may be used either for point-to-point communication or authentication, i.e. between two terminals, or between a central unit, an email server, or several users, clients. Such a central unit preferably comprises a plurality of different key-generating applications, one for each client/user/terminal in communication with the central unit. Alternatively, a key unit could comprise several different original values, in which case the command to the key-generating unit to generate a key also comprises information regarding which original value should be used. It is likewise possible for several units that communicate with the central unit to have identical key generating units, enabling them to communicate with the same key-generating unit in the central unit.

In the following an encrypted transmission or authentication with the aid of the above described system is described. In a first step, an email is produced and encrypted using a key generated by the key generating application in one of the terminals. The email may comprise one or several attachments, e.g. in form of word processed file, image file, JAVA applets or any other digital data. Thus, the email according to the inventions relates both to a message with or without an attachment. The email is transmitted to the receiving terminal and the receiver is asked to obtain an initiating value, the so-called secret or seed. By inputting the secret into the decrypting application of the receiver, the terminals intended for future intercommunication are initiated, in which process they are provided with identical original values and preferably are also synchronised. The system is now ready for use, and at a later time, which may occur after the lapse of an arbitrary period of time after the initiation and at least one of the terminals identifies itself to the other. Identification is achieved when other terminal determines whether the identity given is known and whether it has a corresponding key-generating application, i.e. a key-generating application as defined above and with a corresponding original value. If this is the case, the process proceeds to next step otherwise the process is interrupted.

The calculated keys are then used to execute encrypted/decrypt/authentication. It should be understood, however, that encrypted transmission and authentication of course may be effected simultaneously and in the same process. Encrypting and authentication may be effected with the aid of essentially any encrypting algorithm that uses keys, e.g. as the known DES and RC6, Bluefish etc.

Figure 3:
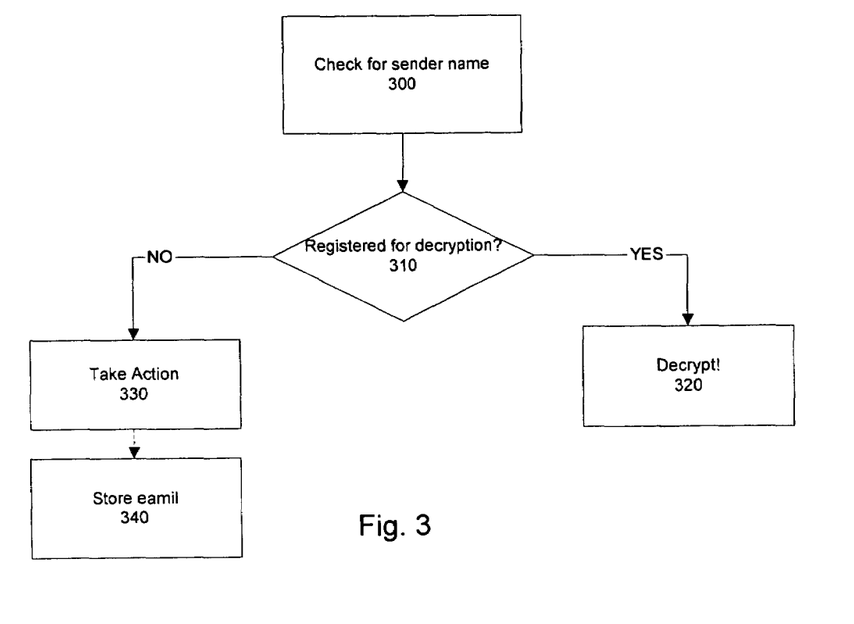
FIG. 3 is a flow diagram illustrating steps of a part of the invention.

Another advantage of the invention is that the application can be used as filter for blocking unwanted e-mails. Today, hundreds of thousands of advertisement emails are sent to receivers. In Outlook, for example, there is a function called "junk mail" which based on a name list or some parameters sends the received emails to a junk mail folder. This function, however, does not work as the names of senders and content of the junk emails are changed. The invention attends to this problem in following way:

As mentioned above and with reference to FIG. 3, the receiving terminal or server comprising the list of sender-receiver pairs, checks 300 for the received address in the list and compares 310 the sender address with the stored addresses. If the email can be decrypted, i.e. the sender address is in the list the email is decrypted 320 and delivered to the receiver. If the email cannot be decrypted, i.e. the sender address is in not the list, the email is either removed to a junk storage or returned 330 to the sender. A message can be attached to the returned email, e.g. notifying the sender of unwanted emails that an encryption program is needed to be able to send emails to the intended receiver. Of course, the email might be sent by a sender, which is not in the list but wanted. For this reason the system can store 340 a copy of the email or just notify the receiver so that the sender can be notified to install encryption application and obtain the secret from the receiver. Clearly, the filtering/blocking function is an optional application.

As mentioned above, the invention also allows a purchasing of entire or parts of the application in a simple way.

Figure 4:
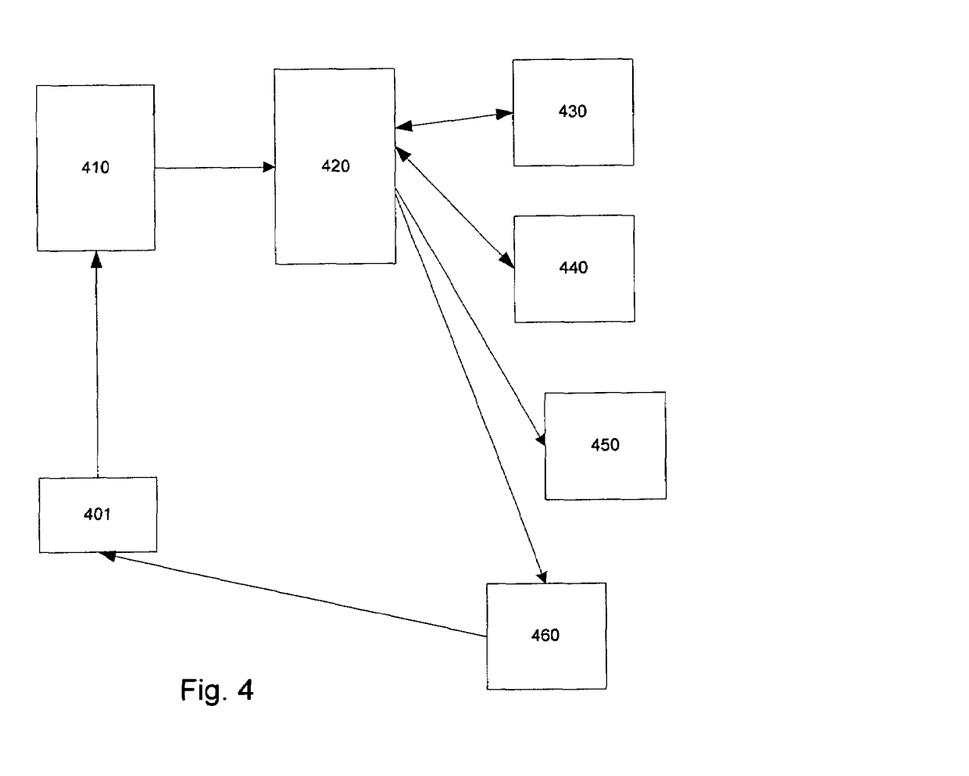
FIG. 4 is a flow diagram illustrating part of the invention.

The graph of FIG. 4 illustrates an automatic purchasing system 400. The receiver 401 receives an information email, to which the encrypted email is attached, to obtain a decryption program. Preferably, the decryption program is provided free or shareware. However, the encryption application must be purchased. When the decryption program is downloaded, also the encryption program is downloaded but cannot be used until a license number, password or similar is provided. For this reason, the buyer is referred to a purchasing address 410, e.g. at Internet, from where a license can be obtained. The purchasing site may require special information about the country, language etc., of the buyer so that a correct version can be obtained. Then the buyer is relocated to ordering site 420 for providing transaction information. The payer may make a transaction in a known way, such as paying by credit card, bank transaction, cash-on-delivery etc. Depending on the transaction method, a clearing 430 or control 440 is made. If the transaction is accepted, the purchasing site 420 sends information to a registry 450 and order to delivery department 460. The delivery department sends either a program package, a license number or any other information necessary to (install and) run the encryption program. A delivery office can deliver the program package/license information. If the program is preinstalled a password/license number can be delivered by (encrypted) email or downloaded from the site.

It is also possible to provide the email from the sender, informing the receiver to obtain a decryption/encryption application, with a reference to a site including a prepaid program download also including the secret to decrypt the email. However, in this case the receiver must obtain a password or other access possibilities to the program.

It is also possible to provide a server arrangement, through which encrypted emails are passed, e.g. by tunnelling the addresses. In this case each email can be debited separately (so-called ticker) thus without a need of purchasing the program(s).

Above examples relate to a network where users use two terminals for accessing the emails. The invention can also be applied in cases where the users use different terminals. In this case the encryption/decryption program and seed can be provided as mobile application, e.g. in form of hardware plug-in (e.g. USB dongle), stored on a information carrying medium such as CD etc. Thus, each time using the email application the key/storage must be provided so that the encryption/decryption application can be executed from there.

In a network such as in an organization or enterprise a server handles the clients in the IP network. The clients need only to create one secure email channel to the servicing server and this server then handles the secure connections to the other users in the network. Each user is supplied with a unique password in order to access email messages and send email messages according to the present invention. Moreover, a network administrator may be supplied with a master password that enables the administrator to access the messages and administer the accounts. In order to increase the security further it is possible to demand that the administrator have to use a hardware unit generating a unique sequence number that is used for authenticating purposes. This unique sequence number is controlled against another hardware or software module, located in for instance the central server, the server based module generates a sequence number which is identical to the one generated by the administrators module if it is the correct hardware unit and they are synhronized with each other. If they are not identical the two systems will try to synchronize with each other a certain amount of times.

Such a hardware unit for use by an administrator may be supplied as for instance, but not limited to, hardware plug-ins using USB (Universal Serial Bus), RS232, RS485, Ethernet, Firewire, Bluetooth, Centronics, SecureDigital, PCMCIA, PC-Card, or similar hardware connectivity standards. It is also possible to instead of the hardware unit use a software module located either on an administrative PC, workstation or similar computational device, or on a computer medium storage device connectable to a network or connectable to a device connected to the network under administration.

It is also possible to provide the system with compression facilities for compressing encrypted emails. Any conventional compressing method can be used.

Optionally, the encrypted and/or decrypted emails can be saved in decrypted or encrypted form. In this case, it is preferred that the emails are encrypted using a password. For security reasons, especially in the companies, there should be a personal password and one Master Key (network manager).

The invention is not limited to the embodiments described and illustrated. The invention can be modified within the

What we claim is:

1. A computer-implemented method of electronically transmitting an e-mail message from a first user having a first terminal to a second user having a second terminal, comprising the steps of:
   a) electronically transmitting an e-mail message in an encrypted form together with a dynamic serial number corresponding to said message by a first terminal to a second terminal, said encrypted message being encrypted prior to transmission by means of a key generated by a first key generator using a seed;
   b) providing to and storing said seed in said second terminal;
   c) receiving said message with the dynamic serial number at said second terminal and using said dynamic serial number to identify said key used to encrypt said message and a sequential order of said message;
   d) synchronising a counting value in each terminal;
   e) using said dynamic serial number, said seed and said counting value by said second terminal to independently generate said key used to encrypt said message;
   f) decrypting said encrypted message at said second terminal using said independently generated key;
   g) based on said seed, generating a list of entrusted terminals; and
   h) accepting e-mail messages only from registries in said list.

2. The method of claim 1, wherein said seed is a first seed, said method further comprising providing a second seed to said second terminal if said first seed is unusable.

3. The method of claim 1, wherein said seed is saved in a dynamic and exchangeable fashion at least in one of the first and second terminals.

4. The method of claim 1, wherein said counting value is generated in a counter in each of said first and second terminals, wherein the synchronisation of the counting values includes synchronising the counters.

5. The method of claim 4, wherein the step of synchronising the counters includes initially synchronizing the counters and supplementarily synchronizing the counters only when needed.

6. The method of claim 1, wherein step (e) is effected by means of a calculating algorithm stored in a non-dynamic and non-changeable fashion in at least one of the terminals.

7. The method of claim 1, wherein said step (b) includes providing said seed by said first user to said second user through at least one of phone call, fax or letter.

8. The method of claim 1, wherein said encrypted message is transmitted with attachments encrypted together with the message.

9. The method of claim 1, further comprising signaling by a transmitting party with parameters which force the receiving party to take special action.

10. The method of claim 1, further comprising supplying a network administrator with a master password, the master password enabling the administrator to access the messages and administer the accounts.

11. The method according to claim 10, further comprising using a hardware unit by the network administrator to generate a unique sequence number and using said unique sequence number for authenticating purposes.

12. The method of claim 1, wherein said dynamic serial number identifies an order in which said encrypted message is transmitted.

13. A system operable to electronically transmit a human-readable message securely between a first user using a first terminal and a second user using a second terminal, said system comprising:
   the first terminal and the second terminal, each of the first and second terminals including a counter configured to periodically change a counting value a calculating unit configured to independently generate a key using a seed and said counting value of said counter belonging to the respective terminal;
   said first terminal being configured to electronically transmit an e-mail message in encrypted form together with a dynamic serial number corresponding to said message from the first terminal to the second terminal, said encrypted message being encrypted by means of said key, said dynamic serial number identifying said key;
   said second terminal being configured to receive said message and use said dynamic serial number to identify said key used to encrypt said message and a sequential order of said message; and
   said second terminal being configured to receive and store said seed in said second terminal,
   such that said calculating unit of said second terminal is configured to independently generate said key using said dynamic serial number, said seed and said counting value, said second terminal is configured to decrypt said encrypted message using said independently generated key,
   the first and second terminals further being arranged to generate a list of entrusted terminals based on said seed, accept e-mail messages only from registries in said list, sense when the counters thereof are not synchronised and then synchronise the counters.

14. The system of claim 13, wherein said means for storing said seed includes a dynamic memory arranged to store said seed in a dynamic and exchangeable fashion.

15. The system of claim 13, wherein the calculating unit of at least one of the terminals is configured in accordance with a calculating algorithm, said calculating algorithm being encoded in a non-dynamic and non-changeable fashion.

16. The system of claim 13, wherein said first terminal is a central terminal and said first seed includes a plurality of said seeds for secure encrypted transmission and said system includes a plurality of said second terminals, each of said second terminals storing a respective seed having an original value from among said plurality of seeds.

17. The system of claim 13, comprising a first unit for generating a unique first sequence of numbers and a second unit other than the first unit for generating a second sequence of numbers identical to the first sequence of numbers when it is a correct unit and the first and second units are synchronised with each other.

18. A computer-implemented method of filtering electronically transmitted e-mail messages from a first user having a first terminal to a recipient being a second user having a second terminal, comprising:
   a) electronically transmitting by a first terminal an e-mail message encrypted into an encrypted form, said encrypted message being encrypted by means of a key generated by a first key generator using a seed;
   b) providing once said second user with said seed for generating a key with a second key generator provided in said second terminal;
   c) generating a list of trusted senders by said second terminal based on a sender-receiver relation generated by said seed; and d) receiving said encrypted message at said second terminal and handling said received encrypted message in a manner based on said list.

19. The method of claim 18, wherein step (d) includes storing, deleting or returning said received encrypted message.

20. The method of claim 1, further comprising transmitting the dynamic serial number from said first terminal to said second terminal.

21. A computer-readable storage medium having instructions stored thereon which are executable by a processor to perform a method of electronically transmitting an e-mail message from a first user having a first terminal to a second user having a second terminal, said instructions being executable by the processor to perform the steps of:
   a) electronically transmitting an e-mail message in an encrypted form together with a dynamic serial number corresponding to said message by a first terminal to a second terminal, said encrypted message being encrypted by means of a key generated by a first key generator using a seed;
   b) providing to and storing said seed in said second terminal;
   c) receiving said dynamic serial number at said second terminal and using said dynamic serial number to identify said key used to encrypt said message and a sequential order of said message;
   d) synchronising a counting value in each terminal;
   e) using said dynamic serial number, said seed and said counting value by said second terminal to independently generate said key used to encrypt said message; and
   f) decrypting said encrypted message at said second terminal using said independently generated key;
   g) based on said seed, generating a list of entrusted terminals; and
   h) accepting e-mail messages only from registries in said list.

22. The storage medium of claim 21, wherein said storage medium is a memory unit.

\* \* \* \* \*